United States Patent [19]

Black et al.

[11] 4,372,738
[45] Feb. 8, 1983

[54] COLLET LOCK FOR A MOLD ASSEMBLY

[75] Inventors: John W. Black, Hickory Corners; Ralph E. Slager, Portage, both of Mich.

[73] Assignee: Pemco-Kalamazoo, Inc., Kalamazoo, Mich.

[21] Appl. No.: 315,375

[22] Filed: Oct. 27, 1981

[51] Int. Cl.³ .............................................. B29F 1/06
[52] U.S. Cl. ................................ 425/451.9; 425/595; 249/165; 249/68; 24/217 R; 24/208 A
[58] Field of Search ............ 425/167, 451.9, 595, 425/451.2; 249/67, 68, 163, 165; 24/216, 217 R, 219, 208 A

[56] References Cited

U.S. PATENT DOCUMENTS

| | | | |
|---|---|---|---|
| 2,313,507 | 10/1965 | Christian et al. | 24/217 R |
| 2,319,479 | 5/1943 | Ryder | 425/451.9 |
| 2,879,545 | 3/1959 | Bailey | 425/451.9 X |
| 2,916,768 | 12/1959 | Quere et al. | 425/451.2 |
| 3,125,801 | 3/1964 | Fields | 249/68 X |
| 3,241,427 | 3/1966 | Bosler | 24/217 X |
| 3,443,472 | 5/1969 | Darr et al. | 24/217 X |
| 3,465,386 | 9/1969 | Brown | 425/167 |
| 3,606,641 | 9/1971 | Carrieri et al. | 425/595X |
| 3,986,805 | 10/1976 | Haines | 425/451.9 X |
| 4,052,033 | 10/1977 | Taylor | 249/67 |
| 4,248,583 | 2/1981 | Hedke et al. | 425/451.9 X |
| 4,315,727 | 2/1982 | Black | 425/563 |

*Primary Examiner*—J. Howard Flint, Jr.
*Attorney, Agent, or Firm*—Blanchard, Flynn, Thiel, Boutell & Tanis

[57] ABSTRACT

A mechanism for locking two mold parts together includes a cylindrical tie rod securely mounted on one mold part and having a circumferential groove therein. A cylindrical collet sleeve is rigidly mounted on the other mold part and has a plurality of axially extending, circumferentially spaced, resiliently flexible arms at one end. The free end of each arm has an inwardly projecting locking member thereon which the arm resiliently urges radially inwardly. When the mold parts are moved to a closed position, the tie rod is received within the collet sleeve and the locking members become axially aligned with and are urged into engagement with the tie rod groove. An annular collar encircling the tie rod is then moved axially until its inner surface snugly engages the outer surface of the collet arms, thereby preventing radially outward movement of the collet arms. The movement of the collar is effected by an annular, pneumatically actuated piston which is disposed in an annular chamber which encircles the collet sleeve and is operatively connected to the collar.

10 Claims, 4 Drawing Figures

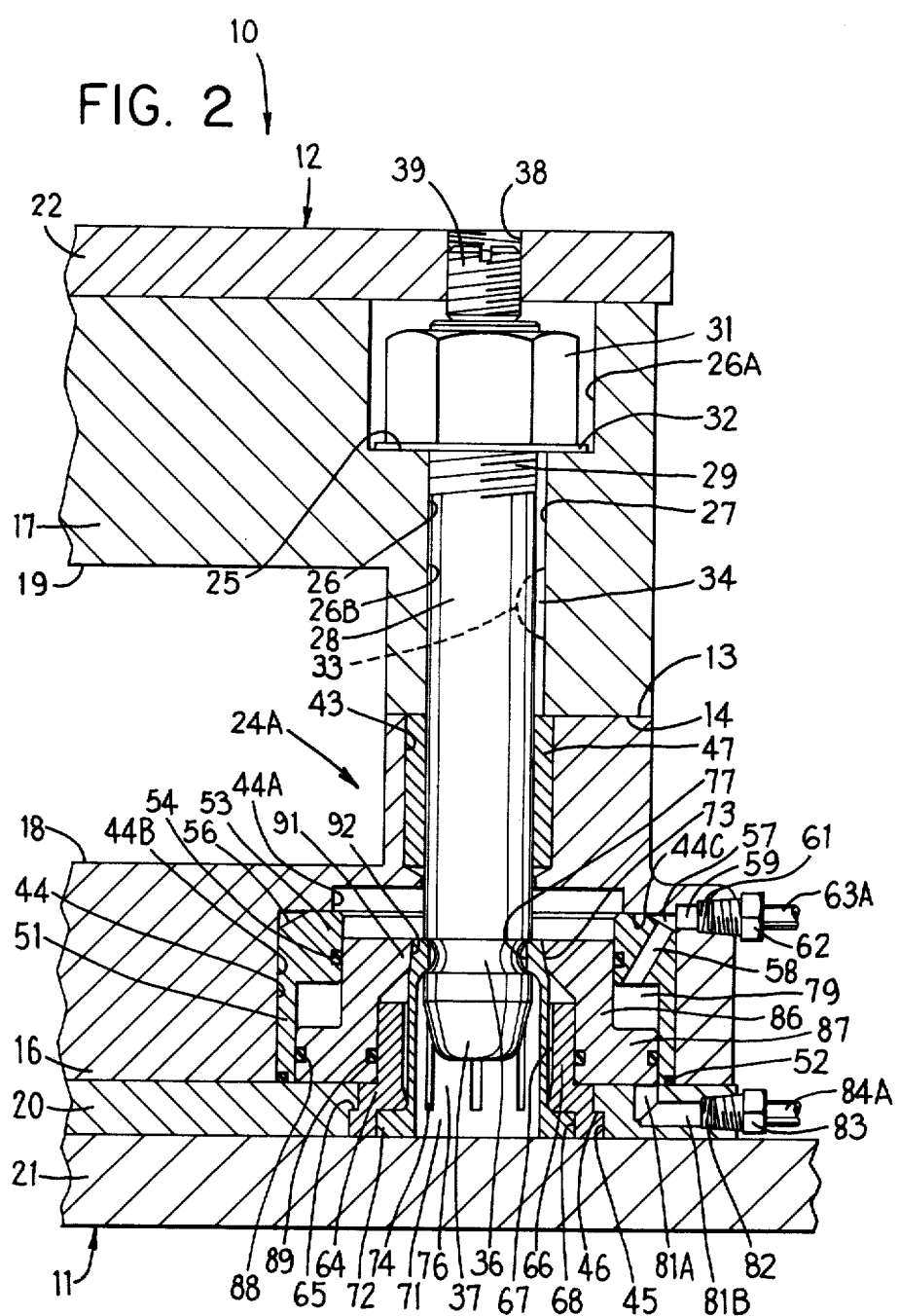

COLLET LOCK FOR A MOLD ASSEMBLY

FIELD OF THE INVENTION

This invention relates to an injection mold for injection molding items from a thermoplastic or similar material and, more particularly, relates to a mechanism for securely locking the halves of the injection mold together during the injection molding process.

BACKGROUND OF THE INVENTION

The improved lock mechanism of the present invention arose out of the need to securely lock the halves of an injection mold together against the high pressures generated during injection and curing of a thermoplastic or similar material, which pressure can easily generate forces exceeding 25 tons.

One mechanism for locking mold halves together is disclosed in copending application Ser. No. 206,806, filed Nov. 14, 1980 now U.S. Pat. No. 4,315,727, entitled "ROTARY BALL LOCK" and owned by the Assignee of the present invention. Although the locking mechanism disclosed therein is very effective, precise radial alignments must be provided and maintained between certain parts thereof, which necessarily limits the extent to which the manufacturing cost of the mechanism can be minimized.

Accordingly, it is an object of this invention to provide an improved locking mechanism for tightly holding together the sections of an injection mold during the injection molding process.

It is a further object of the present invention to provide a locking mechanism, as aforesaid, which does not require precise alignment of the cooperating parts thereof and is relatively inexpensive to manufacture.

It is a further object of the present invention to provide a locking mechanism, as aforesaid, which is simple, durable and requires little or no maintenance.

It is a further object of the present invention to provide a locking mechanism, as aforesaid, which is small in both size and weight, and which may be self-contained within the injection mold.

It is a further object of the present invention to provide a locking mechanism, as aforesaid, which may be actuated smoothly and effortlessly, but will securely lock together the mold parts against the high pressures generated during the injection molding process.

It is a further object of the present invention to provide a locking mechanism, as aforesaid, which is capable of rapid engagement and disengagement, in order to facilitate maximum production output.

SUMMARY OF THE INVENTION

The objects and purposes of the invention, including those set forth above, are met by providing a mechanism for locking together two mold parts movable between an open position spaced from each other and a closed position sealingly contacting each other, including an elongate tie rod which extends between the mold parts, is mounted on one of the mold parts, and has locking means thereon at a location spaced from the first mold part. A locking device provided on the other mold part can selectively engage the locking means on the tie rod for preventing lengthwise movement of the tie rod relative to the other mold part and includes a plurality of locking members which are disposed at angularly spaced locations about the axis of the tie rod and are supported for movement toward and away from the tie rod axis between retracted and locking positions. When the mold parts are in the closed position, the tie rod is received between the locking members and each locking member, when in the locking position, engages the locking means on the tie rod. An actuating mechanism is provided for effecting movement of the locking members between their retracted and locking positions, and a selectively actuable disable mechanism is provided for resisting movement of the locking members away from the locking position.

In a preferred embodiment, the locking device includes a collet sleeve which surrounds the tie rod axis and is fixed against movement relative to the second mold part in a direction parallel to the tie rod axis. The sleeve has a plurality of peripherally spaced slots therein which extend substantially axially from a first end thereof and define a plurality of axially extending arms which are resiliently flexible in directions substantially perpendicular to the tie rod axis, each of the locking members being provided at the free end of a respective one of the arms and on the side thereof facing the tie rod axis. When the mold parts are in the closed position, the tie rod is received within the collet sleeve. The collet sleeve has an outwardly facing surface at the first end thereof, and the disable mechanism includes a collar which surrounds the tie rod axis, is supported on the second mold part for movement parallel to the tie rod axis between first and second positions, and has an inwardly facing surface thereon which is engageable with the outwardly facing surface on the collet sleeve when the locking members are in the locking position and the collar is in the second position in order to prevent movement of the locking members away from the locking position.

The actuating mechanism includes an annular piston chamber which encircles the collet sleeve, an annular piston supported for reciprocal movement in the chamber and operatively coupled to the collar, and a mechanism for selectively supplying pressurized fluid to the piston chamber on opposite sides of the piston to effect reciprocal movement of the piston, which reciprocal movement in turn effects reciprocal movement of the collar between its first and second positions.

In the preferred embodiment, the injection mold includes a plurality of the locking mechanisms, and the pressurized fluid supply mechanism includes a manifold for effecting the selective supply of the pressurized fluid to the annular piston chamber of each locking mechanism.

BRIEF DESCRIPTION OF THE DRAWINGS

Other objects, purposes and advantages of the present invention will be apparent to persons familiar with apparatus of this general type upon reading the following specification and inspecting the accompanying drawings, in which:

FIG. 2 is a sectional view taken along the line II—II of FIG. 1 and illustrates a mechanism for securely locking two parts of the injection mold together;

Figure 1:
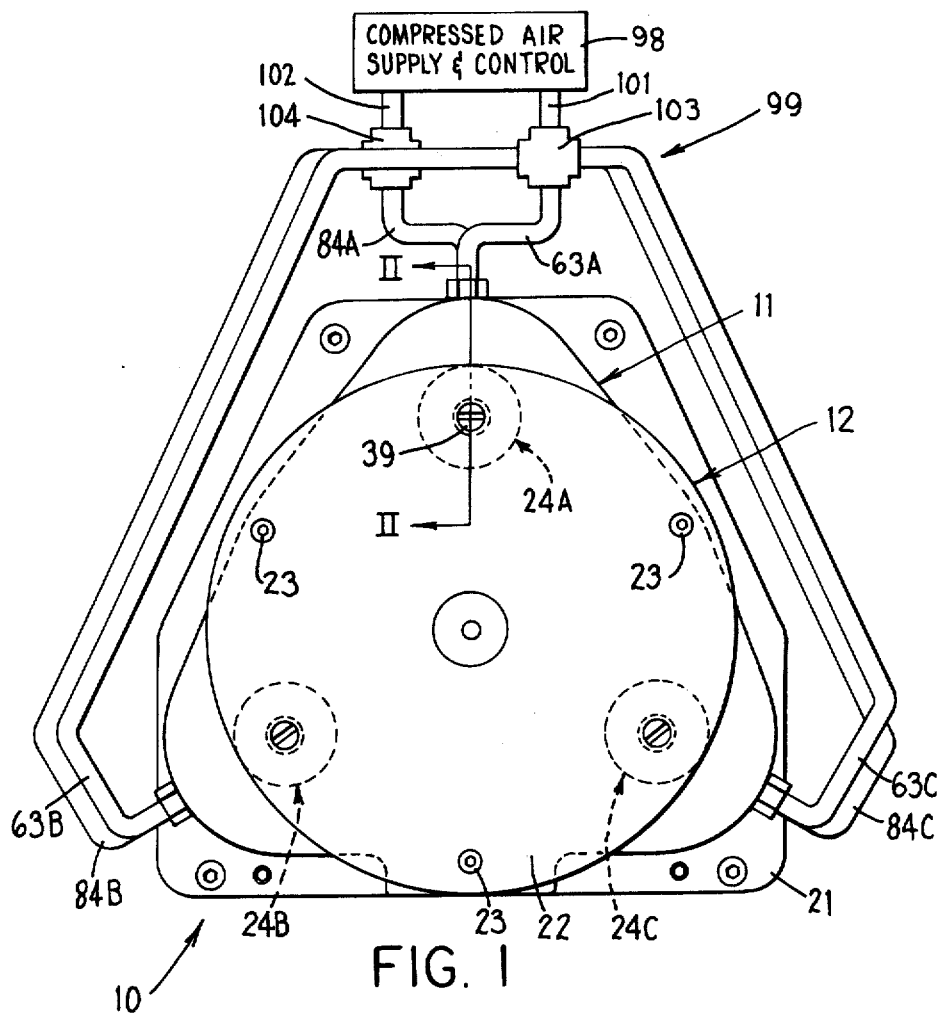
FIG. 1 is a top view of an injection mold embodying the present invention.

Certain terminology will be used in the following description for convenience in reference only and will not be limiting. For example, the words "up" and "down" will designate directions in the drawings to which reference is made. The words "in" and "out" will respectively refer to directions toward and away from the geometric center of the injection mold and designated parts thereof. Such terminology will include the words specifically mentioned above, derivatives thereof and words of similar import.

DETAILED DESCRIPTION

An injection mold 10 is illustrated in FIG. 1 and is similar in many respects to the mold disclosed in copending application Ser. No. 206,806, filed Nov. 14, 1980 and entitled "ROTARY BALL LOCK", the disclosure of which is incorporated herein by reference.

Figure 3:
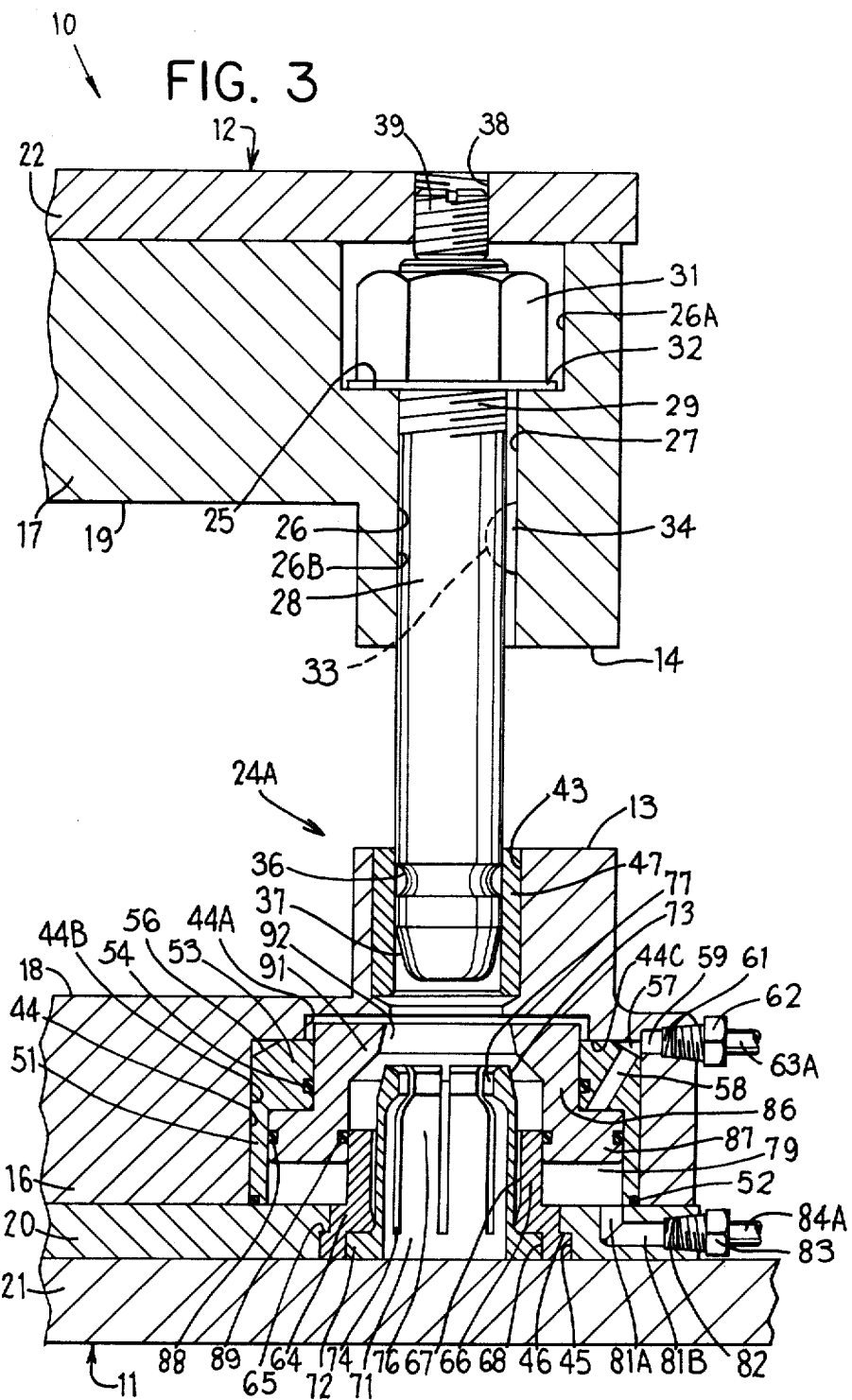
FIG. 3 is a sectional view similar to FIG. 2 showing the locking mechanism in a different position of operation.

Referring to FIGS. 2 and 3, the injection mold 10 includes lower and upper mold parts 11 and 12 which have respective facing surfaces 13 and 14 and are movable between a closed position illustrated in FIG. 2 in which the facing surfaces 13 and 14 are sealingly contacting each other and an open position illustrated in FIG. 3 in which the mold parts 11 and 12 are spaced from each other. Movement of the mold parts 11 and 12 between their open and closed positions is effected by a conventional and not illustrated mechanism, such as a fluid-actuated pressure cylinder attached to one of the mold parts.

The lower and upper mold parts 11 and 12 respectively include lower and upper mold members 16 and 17 which have recesses 18 and 19 in the respective facing surfaces 13 and 14 thereof. Cavity plates are mounted in the recesses 18 and 19 when the mold is being operated and define a mold cavity when the mold parts are in the closed position. These cavity plates are conventional, are not a part of the present invention, and are therefore not illustrated or described in detail.

The lower mold member 16 rests on and is secured in a conventional manner to an intermediate plate 20 which in turn rests on and is secured in a conventional manner to a bottom plate 21. A top plate 22 is secured to the top of the upper mold member 17 by a plurality of screws 23 (FIG. 1).

Referring to FIG. 1, the injection mold 10 includes three locking mechanisms 24A, 24B and 24C which, when actuated, securely hold the mold parts 11 and 12 in the closed position.

The locking mechanism 24A is illustrated in detail in FIGS. 2 and 3, and includes a vertical bore 26 which extends through the upper mold member 17, the upper portion 26A of the bore 26 being of greater diameter than the lower portion 26B thereof, thereby defining an upwardly facing annular shoulder 25 within the bore 26. A vertical keyway 27 is provided in the surface of the lower portion 26B of the bore.

The upper part of a cylindrical tie rod 28 is disposed in the bore 26 and is of substantially the same diameter as the lower bore portion 26B. The upper end 29 of the tie rod 28 is threaded, and threadedly engages a hexagonal nut 31. A flat washer 32 is provided on the tie rod 28 between the nut 31 and the annular shoulder 25. An arcuate recess 33 is provided in the surface of the tie rod 28 and a semicylindrical key 34 is disposed in the recess 33 and the keyway 27 in order to prevent rotation of the tie rod 28 relative to the upper mold part 12. A circumferential groove 36 of substantially semicircular cross section is provided in the surface of the tie rod 28 adjacent the lower end thereof, and a conically tapering surface 37 is provided at the lower end of the tie rod 28.

A threaded bore 38 provided through the top plate 22 is coaxial with the bore 26 in the upper mold member 17. A threaded screw stud 39 is provided in and threadedly engages the bore 38.

A vertical bore 43 provided in the top of the lower mold member 16 is coaxially aligned with the bore 26 in the upper mold member 17 and opens downwardly into a cylindrical recess 44 provided in the lower mold member 16. The recess 44 is coaxial with the bore 43 and has an upper part 44A and a lower part 44B, the upper part 44A being of lesser diameter and axial length than the lower part 44B, thereby defining a downwardly facing annular shoulder 44C. A bore 46 provided through the intermediate plate 20 is coaxial with the bore 43 and has an upper part which is of lesser diameter than its lower part, thereby defining a downwardly facing annular shoulder 46.

The upper portion of the vertical bore 43 is of greater diameter than the cylindrical tie rod 28, and a cylindrical guide bushing 47 having an inside diameter slightly greater than the diameter of the tie rod 28 is securely fixed in the vertical bore 43, for example by a forced fit.

An annular piston sleeve 51 is disposed in the lower portion 44B of the recess 44 in the lower mold member 16. The radially outer surface of the sleeve 51 is disposed firmly against the inner surface of the lower recess portion 44B, the lower end thereof is disposed against the top of the intermediate plate 20, and the top thereof is disposed against the downwardly facing annular shoulder 44C. An annular recess 52 is provided in the lower outer edge of the sleeve 51 and a conventional, elastomeric O-ring seal is disposed in and is of slightly greater cross-sectional dimension than the recess 52. The piston sleeve 51 has an annular, inwardly projecting portion 53 at the upper end thereof, the inside diameter of which is slightly less than the diameter of the upper recess portion 44A. The radially inner surface of the portion 53 of the sleeve 51 has an annular recess 54 therein, and a conventional, elastomeric O-ring seal having a cross-sectional dimension slightly greater than that of the recess 54 is disposed therein.

An annular bevel surface 56 is provided on the upper outer edge of the sleeve 51 and, in conjunction with the walls of the recess portion 44B and the shoulder 44C, defines an annular passageway 57. A plurality of inclined and circumferentially spaced passageways 58, one of which is illustrated in FIGS. 2 and 3, extend from the bevel surface 56 downwardly and inwardly to the undersurface of the inwardly projecting portion 53. A horizontal bore 59 is provided in the lower mold member 16 and communicates at its inner end with the annular passageway 57. The other end 61 of the bore 59 is threaded and a conduit 63A communicates with the horizontal bore 59 through a fitting 62 which threadedly engages the threaded portion 61 of the bore 59.

A hollow cylindrical collet holder 64 has its lower end snugly disposed in the bore 45 in the intermediate plate 21 and has an upwardly facing annular shoulder 65 which engages the downwardly facing annular shoulder 46 of the bore 45. The lower end of the collet holder 64 is disposed against the top of the bottom plate 21. The collet holder is thus fixed against movement in the direction of its axis relative to the lower mold part 11. The collet holder 64 has an upwardly extending cylindrical portion 66 with an inner surface 67 which tapers generally upwardly and outwardly. An annular recess 68 is provided in the inner surface of the collet holder 64 at the lower end thereof.

Figure 4:
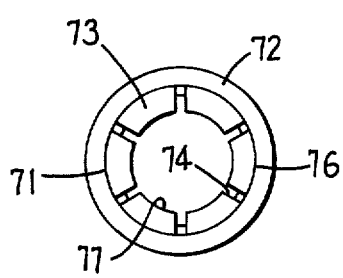
FIG. 4 is a top view of a collet sleeve which is a component of the locking mechanism illustrated in FIG. 2.

Coaxially disposed within the collet holder 64 is a generally cylindrical collet sleeve 71 (FIGS. 2 and 4). The collet sleeve 71 is coaxially aligned with the tie rod 28 and has an outwardly extending annular flange 72 at the lower end thereof which is snugly received within the annular recess 68 of the collet holder 64. The lower end of the collet sleeve 71 is disposed against the top of the bottom plate 21. The collet sleeve 71 is thus fixed against movement in the direction of its axis relative to the lower mold part 11.

The collet sleeve 71 has an axial length which is greater than that of the collet holder 64 and has an upwardly and inwardly tapering outer surface 73 at the upper end thereof which is preferably the surface of a conical frustum. A plurality of circumferentially spaced, axially extending slots are provided in the walls of the collet sleeve 71, each extending from the upper end of the collet sleeve 71 to a location near the top of the annular flange 72. The slots 74 define a plurality of axially extending arms 76 which are resiliently flexible in a radially outward direction. Each of the arms 76 has a radially inwardly projecting locking member 77 thereon adjacent the upper end thereof. The distance between the radially inner surfaces of locking members 77 on diametrically opposite sides of the collet sleeve 71 is normally somewhat less than the diameter of the tie rod 28.

The undersurface of the portion 53 of the piston sleeve 51, the inner surface of the piston sleeve 51 below the portion 53, the portion of the top surface of the bottom plate 21 surrounding the bore 45, and the outer surface of the upright portion 66 of the collet holder 64 define an annular piston chamber 79 which coaxially encircles the collet sleeve 71.

A bore through the intermediate plate 20 includes a short vertical portion 81A which communicates with the piston chamber 79 and a horizontal portion 81B which extends to the peripheral edge of the intermediate plate 20. The outer portion 82 of the horizontal bore portion 81B is threaded and a conduit 84A is coupled thereto by a fitting 83 which threadedly engages the threaded portion 82 of the bore.

An annular piston 86 coaxially encircles the collet sleeve 71 and has an outwardly extending annular flange 87 at the lower end thereof which is disposed in the piston chamber 79. A recess 88 is provided in the radially outer surface of the flange 87 and a conventional, elastomeric O-ring seal is disposed in and is of slightly greater cross-sectional dimension than the recess 88. A recess 89 is provided in the radially inner surface of the piston 86 adjacent the lower end thereof and a conventional, elastomeric O-ring seal of slightly greater cross-sectional dimension than the recess 89 is provided therein. The piston 86 is reciprocally movable in a vertical direction between the positions illustrated in FIGS. 2 and 3. The piston 86 is dimensioned so that the O-rings in the recesses 88 and 89 are respectively in sliding, sealing engagement with the inner surface of the piston sleeve 51 and the outer surface of the collet holder 64, and so that the O-ring in the recess 54 in the piston sleeve 51 is in sliding, sealing engagement with the outer surface of the piston 86. An inwardly extending annular collar is provided at the upper end of the annular piston 86, and has a tapered inner surface 92 which is a conical frustum surface substantially parallel to the conical frustum surface 73 on the collet sleeve 71.

As mentioned hereinabove, three locking mechanisms 24A, 24B and 24C (FIG. 1) are provided in the injection mold 10. The locking mechanisms 24B and 24C are substantially identical to the locking mechanism 24A just described, and are therefore not illustrated or described in detail.

Referring to FIG. 1, compressed air is selectively supplied from a conventional compressed air supply and control 98 to the locking mechanisms 24A, 24B and 24C through a manifold 99. The manifold 99 includes a pair of conduits 101 and 102 which connect the compressed air supply and control 98 to respective multi-port fittings 103 and 104, and includes conduits 63A, 63B and 63C and conduits 84A, 84B and 84C which respectively connect the multi-port fittings 103 and 104 to the mold locking mechanisms 24A, 24B and 24C.

OPERATION

Although the operation of the locking mechanism described above will be understood from the foregoing description by persons skilled in the art, a summary of such operation is now given for convenience. Only the operation of locking mechanism 24A will be described in detail. Locking mechanisms 24B and 24C are actuated simultaneously with the locking mechanism 24A and operate in an identical manner.

Initially, the mold parts 11 and 12 will be in the open position illustrated in FIG. 3 in which they are spaced from each other, and the piston 86 will be in the upper position illustrated in FIG. 3. As the mold parts 11 and 12 are moved from the open position illustrated in FIG. 3 to the closed position of sealing engagement illustrated in FIG. 2, the tie rod 28 will slide axially into the collet sleeve 71, the tapered surface 37 on the lower end of the tie rod 28 engaging the inwardly projecting locking members 77 on the arms 76 of the collet sleeve 71 and urging them radially outwardly to their retracted position by flexing the resilient arms 76. The upward and outward taper of the inner surface 67 of the collet holder 64 permits this flexing movement of the arms 76 to occur without interference with the collet holder 64. Thus, as the mold parts 11 and 12 continue to move toward each other, the locking members 77 will be urged against and will slide along the surface of the tie rod 28.

When the mold parts 11 and 12 reach the closed position illustrated in FIG. 2, the circumferential groove 36 in the tie rod 28 will be axially aligned with the locking members 77 on the collet sleeve 71, and the resiliently flexible arms 76 on the collet sleeve 71 will be urging the locking members 77 thereon radially inwardly to a locking position in which they are engaging the groove 36. Referring to FIG. 1, the compressed air supply and control 98 will then supply compressed air to the locking mechanisms 24A, 24B and 24C through the conduit 101, fitting 103, and conduits 63A, 63B and 63C. Referring to FIG. 3, compressed air from conduit 63A enters locking mechanism 24A through bore 59, annular passageway 57 and inclined passageways 58 and enters the piston chamber 79. This compressed air then acts on the upper surface of the flange 87 of the piston 86 and moves the piston 86 downwardly to the position illustrated in FIG. 2. In this position, the inwardly facing conical surface 92 on the collar 91 securely engages the outwardly facing conical surface 73 on the upper end of the collet sleeve 71, thereby preventing radially outward movement of the flexible arms 76 and maintaining the locking members 77 in positive engagement with the circumferential groove 36. This engagement of the locking members 77 with the circumferential groove 36 on the tie rod 28 prevents axial movement of the tie rod 28 relative to the collet sleeve 71 and thus the lower mold part 11, thereby securely clamping the mold parts 11 and 12 in the closed position.

To release the locking mechanisms 24A, 24B and 24C, the compressed air supply and control 98 (FIG. 1) terminates the supply of compressed air through the conduit 101, fitting 103 and conduits 63A, 63B and 63C, and supplies compressed air through the conduit 102, the fitting 104, and the conduits 84A, 84B and 84C. Referring to FIG. 2, the compressed air from conduit 84A passes through the passageways 81A and 81B of locking mechanism 24A to the piston chamber 79, and then acts on the underside of the annular piston 86 and moves the piston 86 upwardly to the position illustrated in FIG. 3, thereby terminating the engagement between the conical surface 92 of the collar 91 and the conical surface 73 of the collet sleeve 71. The mold parts 11 and 12 are then moved to the open position illustrated in FIG. 3, the resiliently flexible arms 76 being temporarily flexed radially outwardly as the tie rod 28 is withdrawn from the collet sleeve 71, the locking members 77 being urged against and sliding along the surface of the tie rod 28 as it is withdrawn from the collet sleeve 71.

Referring to FIG. 2, the vertical position of the tie rod 28 with respect to the upper mold part 12 can, if necessary, be adjusted during periodic maintenance in the following manner. The screws 23 (FIG. 1) securing the top plate 22 to the upper mold member 17 are removed and the top plate 22 is lifted off the upper mold member 17. The nut 31 on each tie rod 28 is then rotated with a conventional tool such as a socket wrench, causing the tie rod 28 to move either upwardly or downwardly within the bore 26, depending on the direction of rotation of the nut 31. The key 34 slides within the vertical keyway 27 and prevents rotation of the tie rod 28. The cylindrical tie rod 28 is in the proper vertical position when the circumferential groove 36 thereon is axially aligned with the locking members 77 on the collet sleeve 71 when the mold parts 11 and 12 are in the closed position. The top plate 22 is then reattached to the top of the upper mold member 17 using the screws 23, and the threaded studs 39 therein are screwed downwardly until the lower ends thereof engage the upper ends of the respective tie rods 28, thereby holding the nuts 31 and washers 32 against the upwardly facing shoulder 25 and preventing axial movement of the tie rods 28 within the bores 26.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In combination with a mold having two mold parts movable between an open position spaced from each other and a closed position sealingly contacting each other, a mold locking mechanism for securely clamping said mold parts in said closed position, comprising:
an elongate tie rod extending between said mold parts and supported on said one mold part by first mounting means, said tie rod having first locking means thereon at a location spaced from said one mold part;
second locking means provided on the other of said mold parts and cooperable with said first locking means on said tie rod for preventing lengthwise movement of said tie rod relative to said other mold part, said second locking means including a plurality of locking members disposed at angularly spaced locations about the axis of said tie rod and supported for movement toward and away from said tie rod axis between retracted and locking positions, said tie and being received between said locking members when said mold parts are in said closed position, and each said locking member, when said mold parts are in said closed position and said locking members are in said locking position, being engaged with said first locking means on said tie rod;
means for effecting movement of said locking members between said retracted and locking positions; and
selectively actuable means for resisting movement of said locking members away from said locking position,
said second locking means including a collet having a sleeve which surrounds said tie rod axis and is fixed against movement relative to said other mold part in a direction parallel to said tie rod axis, said tie rod being received within said sleeve when said mold parts are in said closed position, said sleeve having therein a plurality of peripherally spaced slots extending substantially axially from one end thereof and defining a plurality of axially extending arms which are resiliently flexible in directions substantially perpendicular to said tie rod axis, each said arm having a said locking member thereon adjacent said one end of said sleeve and on the side thereof facing said tie rod axis.

2. The combination of claim 1, wherein said collet sleeve has outwardly facing surface means thereon adjacent said one end thereof, and wherein said selectively actuable means includes a collar which surrounds said tie rod axis, is supported on said other mold part for movement parallel to said tie rod axis between first and second positions, and has inwardly facing surface means thereon engageable with said outwardly facing surface means on said sleeve when said locking members are in said locking position and said collar is in said second position, thereby resisting movement of said locking members away from said locking position.

3. The combination of claim 2, wherein said inwardly and outwardly facing surface means are each substantially a frustum surface and are substantially parallel to each other.

4. The combination of claim 3, wherein said frustum surfaces are conical.

5. The combination of claim 2, wherein said selectively actuable means includes means defining a piston chamber, a piston supported for reciprocal movement in said chamber and operatively coupled to said collar, and means for selectively supplying pressurized fluid to said piston chamber on opposite sides of said piston for effecting reciprocal movement of said piston in said chamber, said reciprocal movement of said piston effecting reciprocal movement of said collar between said first and second positions.

6. The combination of claim 5, wherein said piston chamber is annular and coaxially surrounds said tie rod axis, and wherein said piston is annular and reciprocates axially in said chamber.

7. The combination of claim 6, wherein said pressurized fluid is air.

8. The combination of claim 6, including a plurality of said locking mechanisms, said supply means including manifold means communicating with said piston chamber of each said locking member for facilitating said selective supply of pressurized fluid thereto.

9. The combination of claim 1, wherein said means for effecting movement of said locking members includes said resiliently flexible arms of said sleeve yieldably urging said locking members toward said locking position and includes a tapered surface on the end of said tie rod remote from said one mold part which is cooperable with said locking members as said mold parts move from said open position to said closed position for effecting movement of said locking members from said locking position to said retracted position against the urging of said arms.

10. The combination of claim 1, wherein said tie rod is substantially cylindrical and said first locking means is a circumferential groove provided in the surface thereof, and wherein said collet sleeve is generally cylindrical and each said locking member is a radially inward projection provided on a respective said arm of said sleeve.

* * * * *